United States Patent [19]

Oyafuso

[11] Patent Number: 4,541,296

[45] Date of Patent: Sep. 17, 1985

[54] SHOCK ABSORBING MOTOR GEAR

[75] Inventor: Harry H. Oyafuso, Southfield, Mich.

[73] Assignee: Ford Motor Company, Dearborn, Mich.

[21] Appl. No.: 514,759

[22] Filed: Jul. 18, 1983

[51] Int. Cl.[4] .................. F16H 55/14; F16H 55/17
[52] U.S. Cl. ................................. 74/425; 74/458
[58] Field of Search .............. 74/425, 434, 457, 458, 74/DIG. 10

[56] References Cited

U.S. PATENT DOCUMENTS

| | | | |
|---|---|---|---|
| 2,812,668 | 11/1957 | Holt | 74/458 |
| 3,122,938 | 3/1964 | Visser | 74/425 X |
| 3,371,549 | 3/1968 | Schrempp | 74/434 |
| 3,611,824 | 10/1971 | Stevens | 74/425 X |
| 4,425,815 | 1/1984 | Norton et al. | 74/425 |

Primary Examiner—Parshotam S. Lall
Assistant Examiner—W. R. Wolfe
Attorney, Agent, or Firm—Peter Abolins; Robert D. Sanborn

[57] ABSTRACT

A gear wheel engages a driving worm gear with teeth which have a face with a curved portion. As a result, the circumference of the gear wheel has a portion which extends around the worm gear to increase the tooth contact area between the gear wheel and the worm gear. The gear wheel provides flexible support for the teeth. When a driving load is applied between the worm gear and the gear wheel, the gear wheel is flexed and the stepped portion of the face helps to maintain tooth contact area.

3 Claims, 8 Drawing Figures

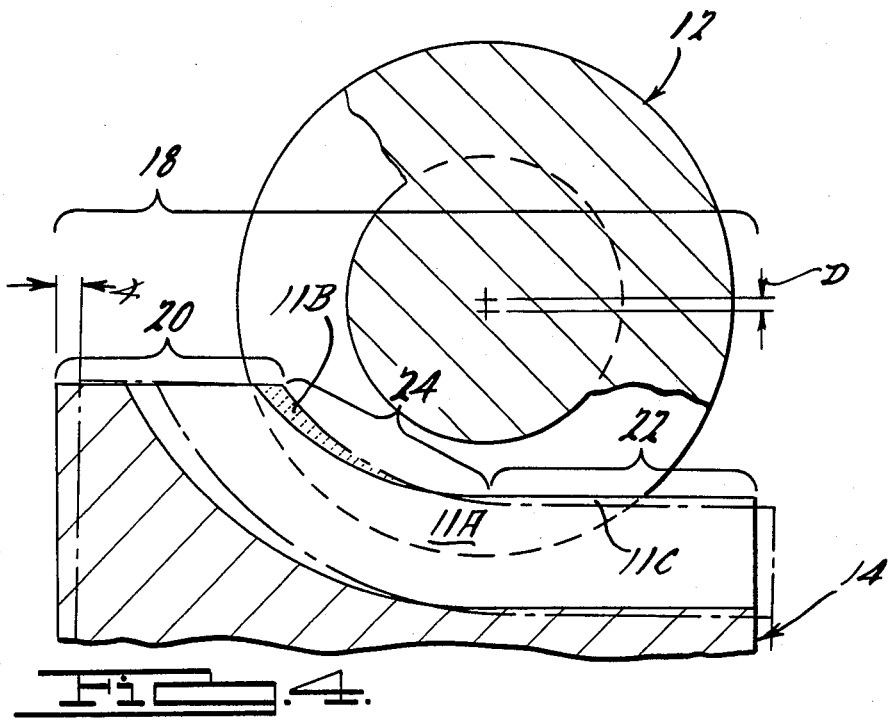
FIG. 4.
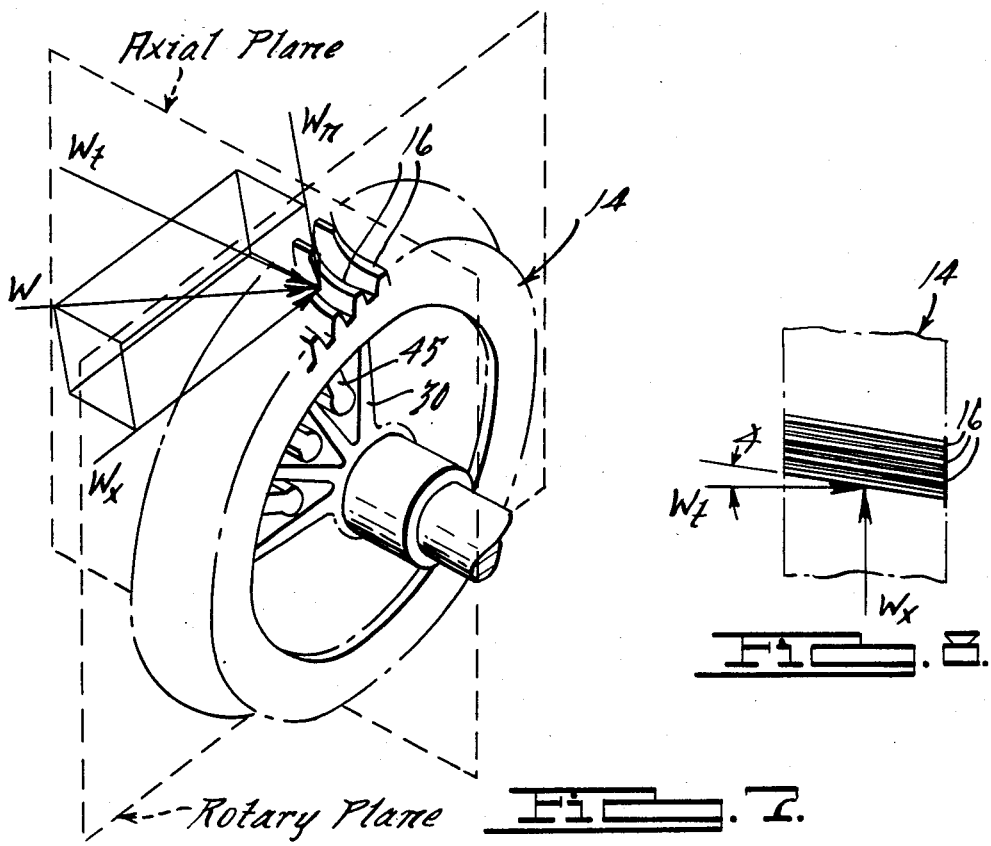
FIG. 7.
FIG. 8.

4,541,296

SHOCK ABSORBING MOTOR GEAR

BACKGROUND OF THE INVENTION

1. Field of the Invention

This invention relates generally to gearing arrangements and, more particularly, toward gearing arrangements for driving a load.

2. Prior Art

Worm gears driving a gear wheel are known. Such an arrangement typically has a gear face, i.e. the distance along the crest of each tooth, with a fixed diameter. Thus, each gear wheel has the shape of a flattened cylinder with teeth extending from vertical sides. The contact area 41 between a worm gear 40 and a gear wheel 42 under light loads is shown in prior art FIG. 1.

When a substantially increased load is applied to worm gear 40 and gear wheel 42, such as shown in prior art FIG. 2, there is reduced tooth contact area 41A. Such reduced contact area 41A may cause gear stripping or other damage to the gear train. It would be desirable to reduce or eliminate the separation of the drive worm gear and the gear wheel caused by large loads.

In particular, these problems can occur in an automotive windshield wiper system. The gear train must be designed so it can withstand the windshield wiper motor stall and armature inertia shock loads under adverse situations such as when the wiper blades are frozen to the windshield or under heavy snow loads where the wiper blade wipe angle is restricted. Under such conditions, the gear teeth will experience high stress levels and may fail in service. These are some of the problems this invention overcomes.

Also known are gear wheels with teeth having extensions at both ends in order to follow the contour of the worm gear. Such double ridges with an intermediate depression for receiving the worm gear present a difficult tooling problem. When molding the gear wheel of a plastic material, the tooling must be formed of at least two parts to permit removal of the formed gear wheel. High quality gear wheels are difficult to obtain because of the possibility of a mismatch between the tool parts. Furthermore, such gear wheels typically have solid interior portions which do not provide for flexing. When there is no flexing all the driving load of the worm gear is applied to the gear wheel tooth in contact with the worm gear and may cause failure of the gear wheel tooth.

SUMMARY OF THE INVENTION

A motor gear for driving a load includes a worm gear and a coupled gear wheel. The gear wheel has gear teeth with contoured faces forming a stepped portion along the outer periphery of the gear wheel. The higher portion of the step extends up from the gear wheel so as to follow the curve around a portion of the outside of the worm gear in order to increase the contact area between the worm gear and the gear wheel. Such an engagement counters the tendency, under load, of the gear teeth of the gear wheel to disengage from the worm gear driving the gear wheel.

Advantageously, the spokes of the gear wheel are formed of a flexible material to allow the gear wheel to deflect towards the driving worm gear under extreme loads partially offsetting the tooth disengagement between the driving worm gear and the gear wheel caused by the separating forces of these two members.

BRIEF DESCRIPTION OF THE DRAWINGS

FIG. 7 is a perspective view of a gear wheel showing the application of tangential, separating and normal forces on the gear wheel; and FIG. 8 is a plan view of an edge of the gear wheel showing the lead angle of the gears and the direction of application of the tangential load and the driving load.

DETAILED DESCRIPTION OF THE INVENTION

Figure 4:
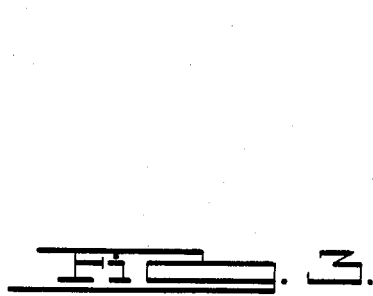
FIG. 4 is a gear wheel in accordance with an embodiment of this invention as shown in FIG. 3 under large loads, such as applied in FIG. 2, indicating the remaining increased tooth contact area in comparison to prior art FIG. 2.
Figure 5:
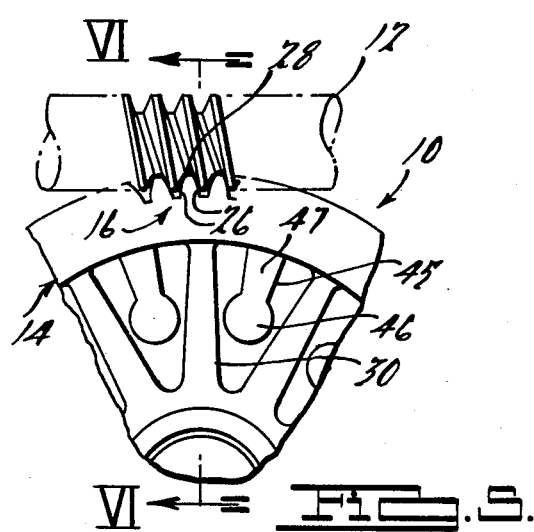
FIG. 5 is a side view of a driving worm gear and gear wheel in accordance with an embodiment of this invention.
Figure 6:
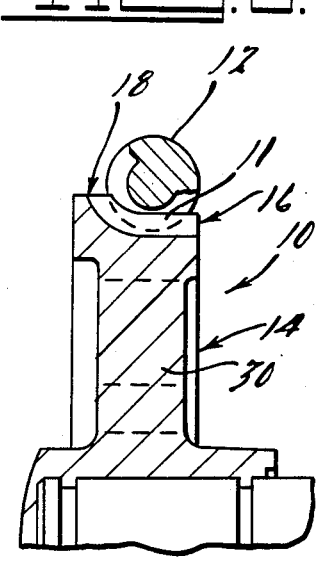
FIG. 6 is a section taken along section 6—6 of FIG. 5.

Referring to FIG. 5, a gear assembly 10 includes a worm gear drive 12 and a gear wheel 14. Gear teeth 16 of gear wheel 14 have a face 18, which is contoured (FIG. 4). The extremities of face 18 adjacent the two end surfaces of gear wheel 14, are a flat portion 20 on one side and a flat portion 22 on another side. Between flat portions 20 and 22 is a curved portion 24 with a variable radius about a point offset from the center of worm gear drive 12. Gear wheel 14 has a constant diameter at axial positions along flat portions 20 and 22. The diameter at flat portion 20 is greater than the diameter at flat portion 22. The diameter at curved portion 24 increases with increasing distance from flat portion 22 toward flat portion 20.

By positioning curved portion 24 so that it extends at least partly around worm gear drive 12, the contact area 11 between the teeth of gear wheel 14 and worm gear drive 12 is increased from that which would be available with a flat face. Each gear teeth 16 has flanks 26 extending down from a crest 28 (FIG. 5). The size and shape of the cross section is constant for each positon of the crest. However, at different axial positions along face 18 in curved portion 24, adjacent cross section areas are radially offset.

Figure 3:
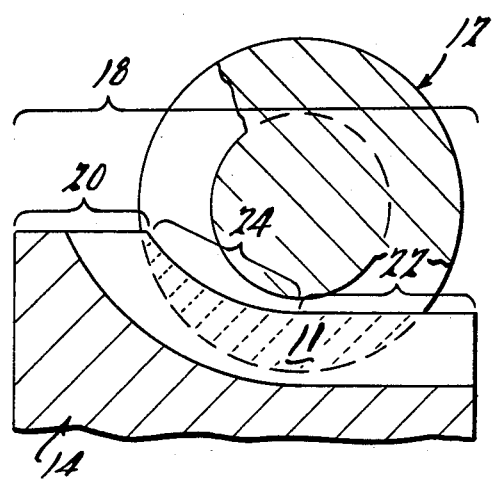
FIG. 3 is a section view of a driving worm gear and a gear wheel having a contoured face to provide increased tooth contact area in accordance with an embodiment of this invention.

The tooth depth of worm gear drive 12 and the tooth depth of gear wheel 14 are advantageously substantially equal so that a large tooth contact area 11 can be achieved (FIG. 3).

Referring to FIG. 4, even when worm gear drive 12 separates from gear wheel 14 by a distance D, there still remains a tooth contact area 11A. In particular, deflection of the tooth in the axial plane by about 1 to 1½ degrees, as shown in dotted outline in FIG. 4, increases the contact area in comparison to an undeflected gear wheel by a shaded area 11B. Although the tilt of the gear wheel also causes loss of a portion of the contact area (11C), the gain exceeds the loss for a net gain in contact area in comparison to an undeflected gear wheel. Advantageously, the center line of worm gear drive 12 is positioned close to the radially most inward extremity of curved portion 24 so that curved portion 24 rises along the periphery of worm gear drive 12.

Gear wheel 14 has spokes 30 which can flex. An advantageous material for gear wheel 14 is unfilled acital resin which has the necessary physical properties to meet the performance requirements of the driven system under all load conditions. The flexing of spokes 30 allows gear wheel 14 to deflect in the rotary and axial planes (FIG. 7). The deflection of gear wheel 14 in the axial plane partially offsets the tooth disengagement between worm gear drive 12 and gear wheel 14 caused by the gear separating forces under extreme loads. Flexing of spokes 30 prevents all of the driving load of worm gear drive 12 from being absorbed by gear teeth 16 in contact with worm gear drive 12.

Figure 1:
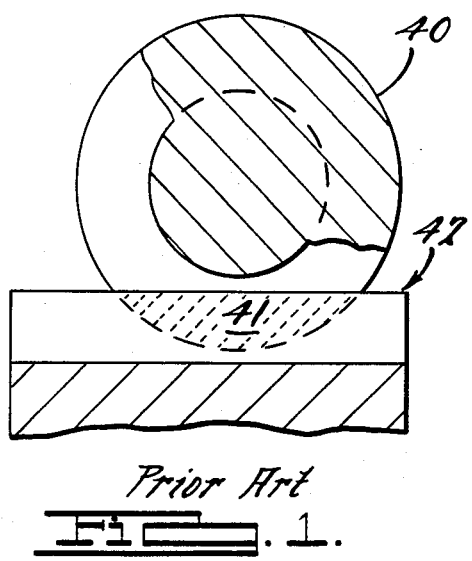
FIG. 1 is a section view through a driving worm gear coupled to a gear wheel, in accordance with the prior art, indicating the effective tooth contact area under normal loads.
Figure 2:
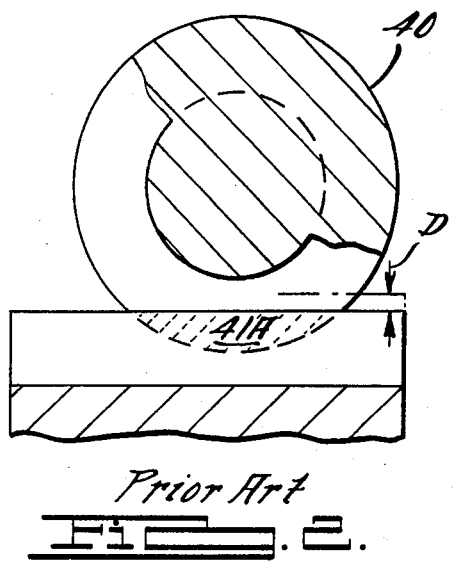
FIG. 2 is a prior art system similar to FIG. 1 indicating the reduced tooth contact area when the system is under large loads.

A typical contact area for an unloaded prior art gear wheel, as in FIG. 1, is 0.122 square inches and a contact area for a loaded prior art gear wheel, as in FIG. 2, is 0.078 square inches, for a 36% decrease in contact area. A typical contact area for an unloaded gear wheel, as shown in FIG. 3, is 0.147 square inches and a contact area, for a loaded gear wheel, as in FIG. 4, is 0.098 square inches, for a 33% decrease. This comparison between the prior art (FIGS. 1 and 2) and an embodiment of this invention (FIGS. 3 and 4) shows a smaller reduction, by 3%, of contact area in accordance with an embodiment of this invention and assumes gear wheels of the same diameter and worm gears of the same size and shape.

Referring to FIGS. 7 and 8, a tangential force, Wt., is applied parallel to the axis of gear wheel 14 against a tooth 16 which is angled with respect to the wheel axis. A rotary force, $W_x$, is parallel to the plane of rotation. A separating force $W_n$ is applied radially to gear wheel 14 and is equal to the force of separation. The resultant of these three forces is the force W. FIG. 7 shows the axial plane which cuts through the axis of the gear wheel and rotary rotation plane which is parallel to the plane of the gear wheel. When a typical windshield wiper motor force is applied to gear wheel 14, gear wheel 14 deflects about 3.5° in the rotary plane and about 1° in the axial plane, with respect to the axis of gear wheel 14. The 3.5° deflection in the rotary plane is accomplished by flexing of spokes 30. The resultant deflection of gear wheel 14 is in a plane normal to the direction of elongation of gear tooth 16 (FIG. 8).

Referring to FIG. 5, spokes 30 are generally tapered with increasing radial distance from the central axis of the gear wheel 14. Intermediate adjacent spokes 30 are stops 45 to limit flexing. Each stop 45 includes a head 46 and a leg 47 aligned radially. Head 46 has a greater circumferential extent than leg 47. Flexing of spokes 30 causes spoke 30 to move into interference with head 46 thereby limiting further flexing. A typical spacing between head 46 and an adjacent spoke 30 is about 0.76 mm. The force resisting flexing is nonlinear and increases substantially when spokes 30 contact head 46 so as to prevent failure of the material at the radially outward portions of spoke 30.

Typical dimensions for gear assembly 10 include:
radius of curvature of curved portion 24-0.210 mm
length of portion 20-0.155 mm
length of portion 22-0.175 mm
tooth crest length-0.335 mm
tooth flank length-0.425 mm
Dimensions of spokes 30 10.558 inches long
  (tapered from (0.162" to 100")
  0.448 inches Thick Various modifications and variations will no doubt occur to those skilled in the art to which this invention pertains. For example, the relative lengths of the curved face and the flat face may be varied from that disclosed herein. These and all other variations which basically rely on the teachings through which this disclosure has advanced the art are properly considered within the scope of this invention.

I claim:

1. A gear wheel for engaging a worm gear having a plurality of gear teeth, each gear tooth having a face with substantially constant diameter portion extending axially along said gear wheel and having a curved portion with increasing diameter with increasing axial displacement along said gear wheel;

said gear wheel including flexible support means providing for flexing of said gear wheel to increase the contact area adjacent said curved portion, between each gear tooth and said worm gear, so as to counter the tendency, under load, of said gear teeth to disengage from said worm gear;

said gear wheel further including a first flat portion along said face at a first end of said curved portion and a second flat portion along said face at a second end of said curved portion, the diameter of said first flat portion being greater than the diameter of said second flat portion, and said first end of said curved portion having a diameter equal to said first flat portion and said second end of said curved portion having a diameter equal to said second flat portion; and said flexible support means including circumferentially spaced flexing spokes extending generally radially so as to couple the center of said gear wheel and the perimeter of said gear wheel and further comprising stop means intermediate adjacent spokes to limit flexing of said spokes.

2. A gear wheel as recited in claim 1 wherein said spokes have a tapering width with increasing radial distance from the center of the gear wheel and said stop means include a leg portion extending radially inward from the perimeter of said gear wheel and a head portion extending circumferentially beyond said leg portion so as to interfere with flexing of said spokes beyond the predetermined point.

3. A gear wheel as recited in claim 2 wherein said spokes extend between the center and the outer periphery of said gear wheel and said stop means extend radially inward from said outer periphery and said head portion being positioned at the inward extremity of said leg portion, said head portion being spaced from said spokes and the center of said gear wheel.

* * * * *